United States Patent [19]

Chyung et al.

[11] 4,186,021
[45] Jan. 29, 1980

[54] OXYNITRIDE GLASS-CERAMICS

[75] Inventors: Kenneth Chyung, Painted Post; Raja R. Wusirika, Corning, both of N.Y.

[73] Assignee: Corning Glass Works, Corning, N.Y.

[21] Appl. No.: 966,193

[22] Filed: Dec. 4, 1978

Related U.S. Application Data

[60] Division of Ser. No. 896,355, Apr. 14, 1978, Pat. No. 4,141,739, which is a division of Ser. No. 843,972, Oct. 20, 1977, Pat. No. 4,097,295, which is a division of Ser. No. 735,313, Oct. 26, 1976, Pat. No. 4,070,198, which is a continuation-in-part of Ser. No. 664,263, Mar. 5, 1976, abandoned.

[51] Int. Cl.$^2$ ............................................. C03C 3/22
[52] U.S. Cl. ................................. 106/39.6; 106/39.7
[58] Field of Search ..................... 106/39.6, 39.7, 52, 106/54

[56] References Cited

U.S. PATENT DOCUMENTS

| | | | |
|---|---|---|---|
| 3,582,307 | 6/1971 | Mulfinger | 65/134 |
| 3,999,835 | 12/1976 | Newns et al. | 350/96.34 |
| 4,097,295 | 6/1978 | Chyung et al. | 106/52 |

OTHER PUBLICATIONS

Umebayashi, S. et al., "β-$Si_3N_4$ Solid Solution Prepared from Volcanic Ash and Al Powder in $N_2$," J. Am. Cer. Soc. 58, (9-10) 1975, p. 464.

*Primary Examiner*—Helen M. McCarthy
*Attorney, Agent, or Firm*—Clinton S. Janes, Jr.

[57] ABSTRACT

The instant invention is directed to the production of glass-ceramic articles from thermally crystallizable glass compositions containing, by weight, about 40-85% $SiO_2$ and 2.5-17% N as basic constituents and utilizing such modifiers as the alkali metals, the elements of Groups IIA and IIB of the Periodic Table, boron, and aluminum to obtain practical glass-forming compositions. In general, at N contents greater than about 3.5%, the predominant crystal phase developed in situ will customarily comprise "nitrogen mullite", silicon oxynitride ($Si_2ON_2$), and/or $\beta'$-$Si_3N_4$ solid solution. The crystal phase which has been denominated in the literature as "nitrogen-mullite" has a lath-like morphology and, hence, is useful in reinforcing the crystalline body. Where the predominant crystal phase comprises a silicate, it is believed that nitrogen is present in some manner within the silicate crystal structure. The parent thermally crystallizable glasses appear to be self-nucleating, i.e., the addition of a conventional nucleating agent such as $TiO_2$, $ZrO_2$, or $SnO_2$ is not required to cause crystallization in situ. It is postulated that N may function as a nucleating agent.

5 Claims, 8 Drawing Figures

Figure 8:
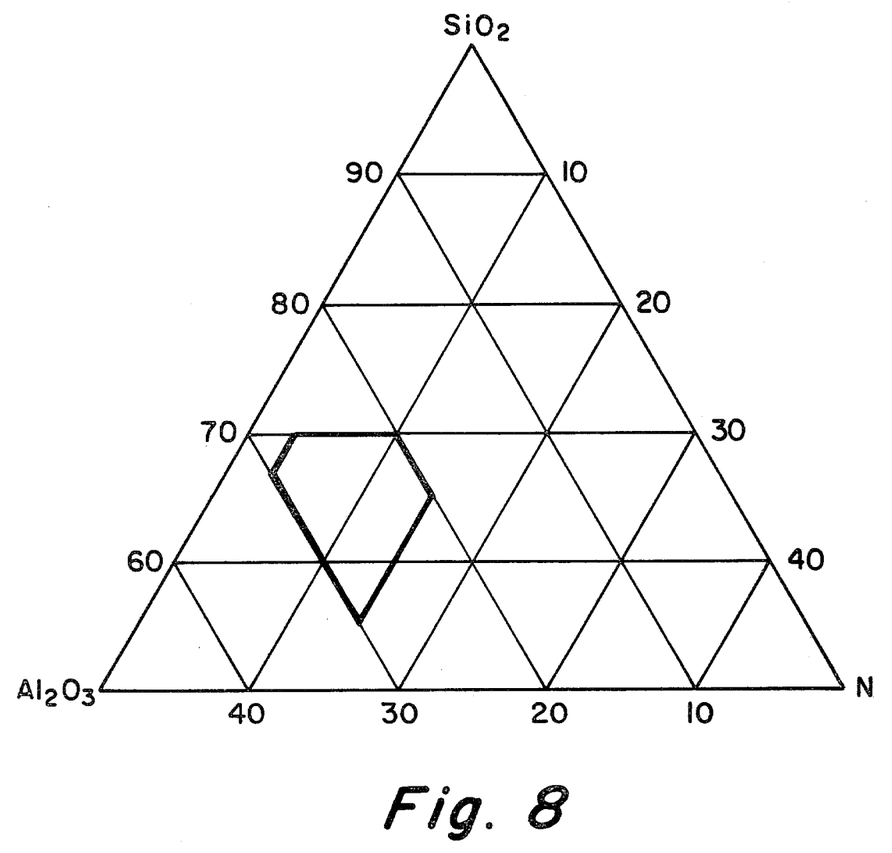
FIG. 8 shows the simple ternary glass forming region.

Fig. 8 ity to the glass. However, the practical glass-forming region of the simple ternary $SiO_2$-$Al_2O_3$-N is quite small, viz., about 55-70% $SiO_2$, 20-30% $Al_2O_3$, and 3.5-15% N. Those ranges of glasses are illustrated in the ternary composition diagram comprising FIG. 8. Nevertheless, the addition of modifying ions can greatly enlarge the composition area in which essentially crystal-free glass bodies can be formed. The most desirable additions appear to be the alkali metals and the elements from Groups IIA and IIB of the Periodic Table, with other useful additions including, but not limited to, such elements as manganese, yttrium, lanthanum, and zirconium. The Group IIA elements can be added in amounts up to about 45% on the oxide basis. In general, the modifiers are considered to be substituted for $SiO_2$ in the base ternary system and that the overall range of operable compositions will be included within the quaternary field, to yield a preferred range of compositions, expressed in weight percent, of about 40-80% $SiO_2$, 10-40% $Al_2O_3$, 3.5-17% N, and 5-25% $M_xO_y$, wherein $M_xO_y$ consists of the operable network forming and/or modifying ingredients other than $Al_2O_3$. In general $M_xO_y$ will desirably consist of up to about 20% of the oxides of the Groups IIA and IIB elements and/or up to about 12% $Li_2O$.

PRIOR ART

As was observed above in the discussion of nitride-containing solid solutions, considerable research has been undertaken involving those materials in the field of ceramics. The activity in the field of glass has been much less and has principally contemplated the passing of gaseous nitrogen through a melt of molten glass which has resulted in a small amount of nitrogen being dissolved and retained in the glass. U.S. Pat. No. 3,582,307 is illustrative of that practice. In that patent a glass-forming batch for an alkali metal aluminoborosilicate glass and also containing carbon was melted and nitrogen bubbled through the melt while an atmosphere of nitrogen surrounded the melt. No mention is made of heat treating the resultant glass to cause crystallization in situ to a glass-ceramic article and the amount of nitrogen dissolved in the glass is necessarily small, i.e., less than 2.5% N by weight.

DESCRIPTION OF PREFERRED EMBODIMENTS

Silicon nitride ($Si_3N_4$) has been viewed with considerable interest in recent years as a material with a great potential for many high temperature engineering applications. The physical properties exhibited by the material, viz., high strength, extraordinary resistance to abrasion, high decomposition temperature, excellent thermal shock resistance, and resistance to corrosive environments, to name but a few, would seem to recommend its unqualified utility for countless high temperature applications. Unfortunately, however, fabricating shapes of the material has met with severe difficulties, thus sharply limiting its practical utility. Inasmuch as $Si_3N_4$ is a covalently-bonded solid, similar in that respect to diamond, it has proved impossible to sinter pure $Si_3N_4$ to maximum density.

Silicon nitride exists in two crystal modifications, i.e., the alpha form and the beta form. The beta form is a typical covalent solid built of $SiN_4$ tetrahedra with three tetrahedra sharing one corner, as is the case in phenacite ($Be_2SiO_4$) or in willemite ($Zn_2SiO_4$). In contrast, the alpha form is believed to consist of an oxynitride with about one out of every 30 nitrogen atoms being replaced by oxygen. The charge imbalance is compensated for through the creation of cation vacancies.

Upon realizing that alpha-$Si_3N_4$ is a defect structure wherein a few nitrogen atoms are replaced by oxygen atoms, we conjectured that it might be possible to replace more nitrogen atoms in the crystal lattice with oxygen atoms. In undertaking this project, we utilized principles similar to those employed for replacing a higher valency ion by a lower valency ion in mineral silicates, e.g., by replacing $Si^{+4}$ with $Al^{+3}$, while simultaneously compensating for the charge imbalance through the introduction of such ions as $Li^+$ or $Mg^{+2}$. As an illustration, dissolving $MgAl_2O_4$ in $Si_3N_4$ can result in complete charge balance. In sum, a wide variety of new materials appears to be possible based upon silicon-aluminum-oxygen-nitrogen tetrahedra ("Sialon"), in much the same way that the essentially infinite range of mineral silicates is built up employing silicon-aluminum-oxygen units.

The Sialon unit cell is similar to that of beta-$Si_3N_4$ ($\beta$-$Si_3N_4$). It contains eight oxygen plus nitrogen atoms and has a range of homogeneity $$Si_{6-0.75x}Al_{0.67x}O_xN_{8-x}$$

wherein x, the number of nitrogen atoms replaced by oxygen, has a maximum of six.

An extremely significant feature of nitrogen is its ability to coordinate tetrahedrally not only with $Si^{+4}$ and $Al^{+3}$, but also with $Li^+$, the alkaline earth metals, and, possibly, $Zn^{+2}$. This is believed to be the result of a favorable cation-to-anion size ratio for tetrahedral coordination, shown in Table I below, coupled with the greater covalent nature of the metal-nitrogen bond, when compared to a metal-oxygen bond.

TABLE I

| Coordination No. | | Cation Radius:Anion Radius | | |
|---|---|---|---|---|
| 8 | Cube Corners | 1-0.732 | | |
| 6 | Octahedra Corners | 0.732-0.414 | | |
| 4 | Tetrahedra Corners | 0.414-0.225 | | |
| 3 | Triangle Corners | 0.225-0.115 | | |
| 2 | Linear | 0.155-0 | | |

| Cation | Radius | Radius Ratio $R^+$:$RO^{-2}$ | Oxygen Coordination | Radius Ratio $R^+$:$RN^{-3}$ | Nitrogen Coordination |
|---|---|---|---|---|---|
| $Na^+$ | 0.95 | 0.679 | 6 | 0.555 | 6 |
| $Li^+$ | 0.60 | 0.429 | 6 | 0.351 | 4 |
| $Mg^{+2}$ | 0.65 | 0.464 | 6 | 0.380 | 4 |
| $Zn^{+2}$ | 0.75 | 0.536 | 6 | 0.439 | 6, 4 (?) |
| $Al^{+3}$ | 0.50 | 0.357 | 4, 6 | 0.292 | 6, 4 (?) |
| $B^{+3}$ | 0.20 | 0.143 | 3 | 0.117 | ? |
| $Si^{+4}$ | 0.41 | 0.293 | 4 | 0.240 | 4 |
| $Be^{+2}$ | 0.31 | 0.221 | 3, 4 | 0.180 | 3 |
| $Mn^{+2}$ | 0.80 | 0.571 | 6 | 0.468 | 6, 4 (?) |
| $Y^{+3}$ | 0.93 | 0.664 | 6 | 0.544 | 6 |

Fluorine appears to promote the crystallization of "nitrogen-mullite" and other nitride phases, possibly through a substitution of the type $$2O^{-2} \rightleftharpoons N^{-3} + F^-$$

OXYNITRIDE GLASS-CERAMICS

This is a division of co-pending application Ser. No. 896,355, filed Apr. 14, 1978, now U.S. Pat. No. 4,141,739 which is a division of Ser. No. 843,972, filed Oct. 20, 1977, now U.S. Pat. No. 4,097,295, issued June 27, 1978, which is a division of Ser. No. 735,313, filed Oct. 26, 1976, now U.S. Pat. No. 4,070,198, issued Jan. 24, 1978, which in turn is a continuation-in-part of Ser. No. 664,263, filed Mar. 5, 1976, now abandoned.

BACKGROUND OF THE INVENTION

The field of glass-ceramics had its genesis in U.S. Pat. No. 2,920,971. As is explained therein, a glass-ceramic article is produced through the controlled crystallization in situ of a glass body. The method of manufacture contemplates three fundamental steps. First, a glass-forming batch, commonly containing a nucleating agent, is melted. Second, this melt is simultaneously cooled to an essentially crystal-free glass and an article of a desired configuration shaped therefrom. Third, the glass article is subjected to a particularly-defined heat treatment to cause the glass to crystallize in situ. In general, the heat treatment will be conducted in two steps. Thus, the glass article will be heated to a temperature somewhat above the transformation range to initiate the development of submicroscopic nuclei therein. Thereafter, the article will be heated to a higher temperature, frequently above the softening point of the glass, to cause the growth of crystals on the nuclei.

Inasmuch as the crystallization results from the substantially simultaneous growth on countless nuclei dispersed through the glass body, a glass-ceramic article will normally be highly crystalline, i.e. greater than 50% crystalline, and the individual crystals will be relatively uniformly fine-grained and homogeneously dispersed, but randomly oriented, throughout a residual glassy matrix. The residual glassy matrix will customarily comprise but a small portion of the glass-ceramic article, and the composition thereof will be far different from that of the parent or original glass since the components making up the crystal phase will have been removed therefrom. It follows, then, that the physical properties demonstrated by the glass-ceramic article will normally be quite dissimilar to those exhibited by the parent glass but will, instead, more nearly approach those of the predominant crystal phase contained therewithin.

Because glass-ceramics are produced through the crystallization in situ of glass articles, forming methods conventional in the glassmaking art are equally suitable here. This factor has permitted articles of complex shapes to be fashioned in accordance with customary glass forming techniques. Such shapes can thereafter be heat treated to secure the desired fine-grained, highly-crystalline body. Furthermore, because of the residual glassy matrix, a glass-ceramic article will be non-porous and free from voids.

U.S. Pat. No. 2,920,971 provides a more complete discussion of the theoretical considerations, as well as the practical aspects, involved in the production of glass-ceramic articles and specific reference is made to that patent for such discussion. The patent also describes the customary microstructure of a glass-ceramic as consisting of fine-grained crystals homogeneously, but randomly oriented, in a residual glassy matrix, the crystals comprising at least 50% by weight of the article.

SUMMARY OF THE INVENTION

The instant invention is concerned with the production of glass-ceramic articles from thermally crystallizable precursor glasses having compositions containing $SiO_2$ and nitrogen as base components, wherein nitrogen is believed to be present as the nitrogen ion $N^{-3}$. The $SiO_2$ and nitrogen, expressed as N, comprise at least 50% by weight of the composition and are present in about 40-85% $SiO_2$ and 2.5-17% N. The N is incorporated as a network ion rather than as a gaseous species. Where less than about 2.5% N is included in the composition, its presence has little substantive effect on the overall properties of the parent glass and resulting glass-ceramic. The remainder of the composition consists of network formers and/or modifiers ($M_xO_y$) which are added to enable glass bodies to be formed through conventional glassmaking practices. Such additions include, inter alia, the alkali metal oxides, the oxides of the elements of Groups IIA and IIB of the Periodic Table, $B_2O_3$, and $Al_2O_3$.

The identity of the crystal phases developed in situ within the articles is influenced by the amount of nitrogen present in the composition. Thus, where the nitrogen content is relatively low the predominant crystal phase observed will commonly be identified through X-ray diffraction analysis as a silicate. Since chemical analysis has indicated the presence of nitrogen in the crystal phase, it is surmised that nitrogen has, in some manner, entered into the structure of the silicate crystal. Where the nitrogen content is high, the predominant crystal phase, as identified via X-ray diffraction analyses, will customarily comprise at least one of the following nitride-containing solid solutions: "nitrogen-mullite", silicon oxynitride ($Si_2ON_2$), and $B'-Si_3N_4$.

Discussions of those nitrogen-containing solid solutions are provided in:

"A Preliminary Investigation of the Reaction of Alpha-Silicon Nitride with Metakaolin", S. Wild, appearing in pages 309–318 of *Special Ceramics* 6, Proceedings of the Sixth Symposium on Special Ceramics held by the British Ceramic Research Association, July 9–11, 1974, edited by P. Popper and "The Production of High-Temperature, High-Strength Nitrogen Ceramics", K. H. Jack, appearing in pages 265–286 of *Ceramics for High-Performance Applications*, Proceedings of the Second Army Materials Technology Conference held at Hyannis, Mass., Nov. 13–16, 1973, published in cooperation with the Metals and Ceramics Information Center, Columbus, Oh., editors John J. Burke, Alvin E. Gorum, R. Nathan Katz The practical glass-forming region of the simple binary $SiO_2$-N is essentially non-existent. At least 15% and, preferably, at least 20% by weight of network formers and/or modifiers ($M_xO_y$) will be included in the composition to enable glasses to be obtained utilizing conventional glass production techniques. Therefore, the practical maximum $SiO_2$ content will generally range about 80% by weight. One of the most desirable additions is $Al_2O_3$ which not only assists in practical glass formation but also imparts good chemical durabil- The introduction of fluorine also appears to foster the crystallization of nitrogen-silicate and/or nitrogen-containing crystals.

Table II records a group of approximate compositions, expressed in weight percent on the oxide basis, illustrating the parameters of the instant invention. Since it is not known with which cation(s) the fluorine and nitrogen are combined, they are merely reported as fluoride (F) and nitrogen (N) and the oxygen $\approx$ fluorine and oxygen $\approx$ nitrogen correction factor recited in accordance with conventional glass analysis practice. The actual batch ingredients can comprise any materials, either the oxide or other compound, which, when melted together, will be converted to the desired oxide in the proper proportions. The fluorine will commonly be supplied utilizing such compounds as $AlF_3$, $MgF_2$, $LiF$, $ZnF_2$, and $CaF_2$, depending upon the compositions involved. In the following compositions, nitrogen was added as $Si_3N_4$. However, other nitrogen-containing compounds, such as AlN, $Si_2OH_2$, $Li_3N$, or $Mg_3N_2$, can be employed. Volatilization of nitrogen and fluorine from the melt is dependent upon the melting temperature and atmosphere utilized. Losses of up to 50% by weight can occur although, in general, such will run between about 10-40%.

The batch ingredients will be compounded, ball-milled together to assist in obtaining a homogeneous melt, and the mixture then run into silica, molybdenum, or graphite crucibles. Since an inherently strongly reducing atmosphere is created by nitride, a platinum crucible cannot be utilized. And, since nitrogen solubility increases significantly in a reducing atmosphere (as much as five orders of magnitude compared to an oxidizing environment), it is most beneficial to melt the compositions in a nitrogen or other oxygen-deficient atmosphere.

Where a silica crucible is employed, the melting process will be conducted in air in a covered crucible, whereas melting in a molybdenum or graphite crucible will be undertaken under a nitrogen atmosphere. Thus, the partial pressure of oxygen ($pO_2$) in the melting environment is of considerable importance in fusing oxynitride compositions. Hence, if the environment is very reducing, i.e., $pO_2 < 10^{-10}$, volatilization of $SiO_2$ as $SiO$ takes place, as well as the vaporization of such readily reducible oxides as ZnO and PbO. In contrast, if highly oxidizing conditions are involved, i.e., $pO_2 > 10^{-1}$, oxidation of $Si_3N_4$ in the batch will occur.

The crucibles containing the batches were covered, placed in induction-heated furnaces operating at about 1500°–1850° C., and the batches melted for about 1–16 hours. The melts were poured into steel molds to yield glass slabs and these slabs immediately transferred to an annealer commonly operating at about 600°–700° C. Samples were cut from the slabs to be used for the determination of physical property measurments. Halides and chalcogenides may optionally be included as fining agents.

Table IIA records, in parts by weight, the actual batch materials utilized in the examples of Table II along with the melting temperature (° C.), the type of crucible employed [$SiO_2$, Mo or graphite (C)], and the furnace atmosphere employed. Where a nitrogen atmosphere was employed, the $pO_2$ and $pN_2$ are reported.

TABLE II

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| $SiO_2$ | 70.4 | 70.4 | 70.4 | 70.4 | 70.4 | 70.4 | 70.4 | 70.4 | 65.4 | 65.4 | 65.4 | 65.4 | 65.4 | 65.4 | 65.4 | 65.4 | 65.4 |
| $Al_2O_3$ | 22.2 | 22.2 | 22.2 | 22.2 | 22.2 | 22.2 | 22.2 | 22.2 | 22.2 | 22.2 | 22.2 | 22.2 | 22.2 | 22.2 | 22.2 | 22.2 | 22.2 |
| MgO | 7.0 | 5.0 | 5.0 | 5.0 | 5.0 | 5.0 | 5.0 | 5.0 | 15.0 | — | — | — | 10.0 | — | 7.5 | 7.5 | — |
| F | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 |
| N | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 |
| $Li_2O$ | 3.0 | — | — | — | — | — | — | — | — | — | — | 5.0 | 5.0 | 5.0 | — | — | — |
| SrO | — | 5.0 | — | — | — | — | — | — | — | — | — | — | — | — | — | — | — |
| BaO | — | — | 5.0 | — | — | — | — | — | — | — | 15.0 | — | — | 10 | — | 7.5 | 7.5 |
| ZnO | — | — | — | 5.0 | — | — | — | — | — | 15.0 | — | 10.0 | — | — | 7.5 | — | 7.5 |
| $Na_2O$ | — | — | — | — | 5.0 | — | — | — | — | — | — | — | — | — | — | — | — |
| $K_2O$ | — | — | — | — | — | 5.0 | — | — | — | — | — | — | — | — | — | — | — |
| $Y_2O_3$ | — | — | — | — | — | — | 5.0 | — | — | — | — | — | — | — | — | — | — |
| $Cs_2O$ | — | — | — | — | — | — | — | 5.0 | — | — | — | — | — | — | — | — | — |
| | 108.8 | 108.8 | 108.8 | 108.8 | 108.8 | 108.8 | 108.8 | 108.8 | 108.8 | 108.8 | 108.8 | 108.8 | 108.8 | 108.8 | 108.8 | 108.8 | 108.8 |
| $O \approx F$ | −0.6 | −0.6 | −0.6 | −0.6 | −0.6 | −0.6 | −0.6 | −0.6 | −0.6 | −0.6 | −0.6 | −0.6 | −0.6 | −0.6 | −0.6 | −0.6 | −0.6 |
| $O \approx N$ | −8.2 | −8.2 | −8.2 | −8.2 | −8.2 | −8.2 | −8.2 | −8.2 | −8.2 | −8.2 | −8.2 | −8.2 | −8.2 | −8.2 | −8.2 | −8.2 | −8.2 |
| | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

| | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| $SiO_2$ | 69.6 | 70.4 | 70.4 | 70.4 | 69.1 | 52.8 | 67.8 | 52.8 | 54.6 | 59.6 | 71.1 | 72.1 | 74.4 | 65.3 | 66.9 | 63.7 | 55.7 |
| $Al_2O_3$ | 17.0 | 25.0 | 22.2 | 22.2 | 21.8 | 28.0 | 18.0 | 28.8 | 30.6 | 25.4 | 23.2 | 23.8 | 14.0 | 22.0 | 22.0 | 32.5 | 36.6 |
| F | — | 1.8 | 1.4 | 1.4 | 1.4 | 3.4 | 3.4 | 3.4 | 1.4 | — | 1.4 | 2.0 | — | — | — | — | — |
| N | 9.2 | 4.8 | 4.8 | 4.8 | 4.7 | 4.0 | 4.0 | 4.0 | 7.8 | 9.2 | 4.4 | 4.4 | 7.6 | 6.0 | 4.0 | 8.0 | 4.0 |
| MgO | 20.0 | 3.9 | 4.0 | 4.0 | 4.9 | — | — | — | 19.6 | 16.6 | 8.0 | — | 17.0 | 17.0 | 14.0 | — | — |
| BaO | — | 3.0 | 6.0 | 3.0 | — | — | — | — | — | — | — | — | — | — | — | — | — |
| $Li_2O$ | — | — | — | 3.0 | 3.9 | — | — | — | — | 5.0 | — | 6.0 | — | — | — | 9.5 | 10.6 |
| $Y_2O_3$ | — | — | — | — | 2.9 | 5.0 | — | — | — | — | — | — | — | — | — | — | — |
| ZnO | — | — | — | — | — | 15.0 | — | — | — | — | — | — | — | — | — | — | — |
| MnO | — | — | — | — | — | — | 20.0 | — | — | — | — | — | — | — | — | — | — |
| BeO | — | — | — | — | — | — | — | 15.0 | — | — | — | — | — | — | — | — | — |
| | 115.8 | 108.9 | 108.8 | 108.8 | 108.7 | 108.2 | 108.2 | 108.2 | 114.0 | 115.8 | 108.1 | 108.3 | 113.0 | 110.3 | 106.9 | 113.7 | 106.9 |
| $O \approx F$ | — | −0.8 | −0.6 | −0.6 | −0.6 | −1.4 | −1.4 | −1.4 | −0.6 | — | −0.6 | −0.8 | — | — | — | — | — |
| $O \approx N$ | −15.8 | −8.1 | −8.2 | −8.2 | −8.1 | −6.8 | −6.8 | −6.8 | −13.4 | −15.8 | −7.5 | −7.5 | −13.0 | −10.3 | −6.9 | −13.7 | −6.9 |
| | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

| | 35 | 36 | 37 | 38 | 39 | 40 | 41 | 42 | 43 | 44 | 45 | 46 |
|---|---|---|---|---|---|---|---|---|---|---|---|---|
| $SiO_2$ | 80.3 | 57.9 | 77.8 | 53.0 | 75.7 | 71.4 | 66.2 | 79.8 | 61.9 | 70.4 | 74.3 | 74.4 |
| $Al_2O_3$ | 14.6 | 34.0 | 26.5 | 37.6 | 23.2 | 26.7 | 30.8 | 23.8 | 20.6 | 22.2 | — | 21.2 |
| F | — | — | — | 1.4 | 1.4 | 1.4 | 1.4 | 1.3 | 1.3 | 1.4 | — | 0.4 |
| N | 4.0 | 4.0 | 6.0 | 8.3 | 8.3 | 8.3 | 8.3 | 18.7 | 7.8 | 4.8 | 6.0 | 2.0 |

TABLE II-continued

| | | | | | | | | | | | | |
|---|---|---|---|---|---|---|---|---|---|---|---|---|
| MgO | — | 4.0 | — | 14.6 | — | — | — | 9.0 | — | — | — | 1.6 |
| Li₂O | 8.0 | 7.0 | — | — | 6.3 | 7.1 | 8.2 | — | — | — | 20.0 | 4.0 |
| ZnO | — | — | — | — | — | — | — | — | 15.5 | — | — | — |
| ZrO₂ | — | — | — | — | — | — | — | — | 5.8 | — | — | — |
| As₂O₅ | — | — | — | — | — | — | — | — | 1.0 | — | — | — |
| CaO | — | — | — | — | — | — | — | — | — | 5.0 | — | — |
| | 106.9 | 106.9 | 110.3 | 114.9 | 114.9 | 114.9 | 114.9 | 132.0 | 113.9 | 108.8 | 110.3 | 103.6 |
| O≈F | — | — | — | −0.6 | −0.6 | −0.6 | −0.6 | −0.6 | −0.5 | −0.6 | — | −0.2 |
| O≈N | −6.9 | −6.9 | −10.3 | −14.3 | −14.3 | −14.3 | −14.3 | −32.0 | −13.4 | −8.2 | −10.3 | −3.4 |
| | 100.0 | 100.0 | 100.0 | 100.0 | 100.0 | 100.0 | 100.0 | 100.0 | 100.0 | 100.0 | 100.0 | 100.0 |

TABLE IIA

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SiO₂ | 55 | 55 | 55 | 55 | 55 | 55 | 55 | 55 | 50 | 50 | 50 | 50 | 50 | 50 | 50 | 50 |
| Al₂O₃ | 21 | 21 | 21 | 21 | 21 | 21 | 21 | 21 | 21 | 21 | 21 | 21 | 21 | 21 | 21 | 21 |
| Si₃N₄ | 12 | 12 | 12 | 12 | 12 | 12 | 12 | 12 | 12 | 12 | 12 | 12 | 12 | 12 | 12 | 12 |
| AlF₃ | 2 | 2 | 2 | 2 | 2 | 2 | 2 | 2 | 2 | 2 | 2 | 2 | 2 | 2 | 2 | 2 |
| MgO | 7 | 5 | 5 | 5 | 5 | 5 | 5 | 5 | 15 | — | — | — | 10 | — | 7.5 | 7.5 |
| Li₂O | 3 | — | — | — | — | — | — | — | — | — | — | 5 | 5 | 5 | — | — |
| SrO | — | — | — | — | — | — | — | — | — | — | — | — | — | — | — | — |
| BaO | — | — | 5 | — | — | — | — | — | — | — | 15 | — | — | 10 | — | 7.5 |
| ZnO | — | — | — | 5 | — | — | — | — | — | 15 | — | 10 | — | — | 7.5 | — |
| Na₂O | — | — | — | — | 5 | — | — | — | — | — | — | — | — | — | — | — |
| K₂O | — | — | — | — | — | 5 | — | — | — | — | — | — | — | — | — | — |
| Y₂O₃ | — | — | — | — | — | — | 5 | — | — | — | — | — | — | — | — | — |
| Cs₂O | — | — | — | — | — | — | — | 5 | — | — | — | — | — | — | — | — |
| BeO | — | — | — | — | — | — | — | — | — | — | — | — | — | — | — | — |
| MnO | — | — | — | — | — | — | — | — | — | — | — | — | — | — | — | — |
| Temp. | 1650 | 1650 | 1650 | 1650 | 1650 | 1650 | 1650 | 1650 | 1650 | 1650 | 1650 | 1650 | 1650 | 1650 | 1650 | 1650 |
| Crucible | SiO₂ | SiO₂ | SiO₂ | SiO₂ | SiO₂ | SiO₂ | SiO₂ | SiO₂ | SiO₂ | SiO₂ | SiO₂ | SiO₂ | SiO₂ | SiO₂ | SiO₂ | SiO₂ |
| pO₂ | air | air | air | air | air | air | air | air | air | air | air | air | air | air | air | air |
| pN₂ | — | — | — | — | — | — | — | — | — | — | — | — | — | — | — | — |

| | 17 | 18 | 19 | 20 | 21 | 22 | 23 | 24 | 25 | 26 | 27 | 28 | 29 |
|---|---|---|---|---|---|---|---|---|---|---|---|---|---|
| SiO₂ | 50 | 40 | 55 | 55 | 55 | 53.9 | 40 | 55 | 38.2 | 29.4 | 29.9 | 57 | 58 |
| Al₂O₃ | 21 | 17 | 25 | 21 | 21 | 20.6 | 20 | 15 | 23.9 | 29.4 | 25.4 | 22 | 22 |
| Si₃N₄ | 12 | 23 | 12 | 12 | 12 | 11.8 | 10 | 10 | 9.6 | 19.6 | 23.1 | 11 | 11 |
| AlF₃ | 2 | — | 3 | 2 | 2 | 2.0 | 5 | 5 | 4.8 | 2.0 | — | 2 | 3 |
| MgO | — | 20 | 2 | 4 | 4 | 4.9 | — | — | — | 19.6 | 16.6 | 8 | — |
| Li₂O | — | — | — | — | 3 | 3.9 | — | — | — | — | 5 | — | 6 |
| SrO | — | — | — | — | — | — | — | — | — | — | — | — | — |
| BaO | 7.5 | — | 3 | 6 | 3 | — | 15 | — | — | — | — | — | — |
| ZnO | 7.5 | — | — | — | — | — | — | — | — | — | — | — | — |
| Na₂O | — | — | — | — | — | — | — | — | — | — | — | — | — |
| K₂O | — | — | — | — | — | — | — | — | — | — | — | — | — |
| Y₂O₃ | — | — | — | — | — | 2.9 | 10 | — | — | — | — | — | — |
| Cs₂O | — | — | — | — | — | — | — | — | — | — | — | — | — |
| BeO | — | — | — | — | — | — | — | 15 | — | — | — | — | — |
| MnO | — | — | — | — | — | — | — | — | 23.5 | — | — | — | — |
| Temp. | 1650 | 1650 | 1800 | 1750 | 1750 | 1700 | 1650 | 1650 | 1650 | 1650 | 1700 | 1650 | 1650 |
| Crucible | SiO₂ | C | C | C | C | C | SiO₂ | SiO₂ | SiO₂ | SiO₂ | C | SiO₂ | SiO₂ |
| pO₂ | air | 10⁻⁴ | 10⁻⁴ | 10⁻⁴ | 10⁻⁴ | 10⁻⁴ | air | air | air | air | 10⁻⁴ | air | air |
| pN₂ | — | ≈1 | ≈1 | ≈1 | ≈1 | ≈1 | — | — | — | — | ≈1 | — | — |

| | 30 | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|
| SiO₂ | 50 | 46 | 54 | 38.0 | 42.8 | 67.4 | 45 | 58.8 | 26.8 | 49.0 | 44.7 | 39.5 | 19.7 | 36.9 | 55 | 63 | 68.0 |
| Al₂O₃ | 14 | 22 | 22 | 32.5 | 36.6 | 14.6 | 34 | 26.5 | 37.1 | 21.9 | 25.4 | 29.5 | 22.6 | 19.4 | 21 | — | 20.8 |
| Si₃N₄ | 19 | 15 | 10 | 20.0 | 10.0 | 10.0 | 10 | 15.0 | 21.2 | 20.8 | 20.8 | 20.8 | 46.7 | 19.4 | 12 | 15 | 5.0 |
| AlF₃ | — | — | — | — | — | — | — | — | — | 2.0 | 2.0 | 2.0 | 2.0 | 2.0 | 2 | — | 0.6 |
| MgO | 17 | 17 | 14 | — | — | — | 4 | — | 14.9 | — | — | — | 9.0 | — | 5 | — | 1.6 |
| Li₂O | — | — | — | 9.5 | 10.6 | 8.0 | 7 | — | — | 6.3 | 7.1 | 8.2 | — | — | — | 20 | 4.0 |
| ZnO | — | — | — | — | — | — | — | — | — | — | — | — | — | 15.5 | — | — | — |
| ZrO₂ | — | — | — | — | — | — | — | — | — | — | — | — | — | 5.8 | — | — | — |
| As₂O₃ | — | — | — | — | — | — | — | — | — | — | — | — | — | 1.0 | — | — | — |
| CaO | — | — | — | — | — | — | — | — | — | — | — | — | — | — | 5 | — | — |
| Temp. | 1650 | 1650 | 1650 | 1650 | 1650 | 1650 | 1650 | 1850 | 1650 | 1650 | 1650 | 1650 | 1650 | 1650 | 1650 | 1500 | 1650 |
| Crucible | SiO₂ | SiO₂ | SiO₂ | SiO₂ | SiO₂ | SiO₂ | SiO₂ | Mo | SiO₂ | SiO₂ | SiO₂ | SiO₂ | SiO₂ | SiO₂ | SiO₂ | SiO₂ | SiO₂ |
| pO₂ | air | air | air | air | air | air | air | 10⁻⁴ | air | air | air | air | air | air | air | air | air |
| pN₂ | — | — | — | — | — | — | — | ≈1 | — | — | — | — | — | — | — | — | — |

Example 42 formed a rather viscous melt which could not be poured into an essentially crystal-free glass. Hence, only by melting at higher temperatures and employing severe quenching techniques could a crystal-free glass be formed. This circumstance has led to the adoption of 17% by weight as a practical maximum N content.

Table III records various heat treatments applied to the glass bodies of Table II to cause crystallization in situ. Thus, the glass article is heated to a temperature between about 800°–1300° C. for a period of time sufficient to develop substantial crystallization.

In the laboratory examples reported in Table II, the glass bodies were customarily cooled to room temperature to permit examination of glass quality. Such practice is not necessary. All that is required is that the molten glass batch be cooled to a temperature at least within the transformation range and then reheated to cause crystallization. (The transformation range is defined as the temperature at which a molten mass becomes an amorphous solid—that temperature customarily being deemed to lie in the vicinity of the annealing point of the glass.)

The rate of crystallization is a direct function of the temperature employed. Therefore, a brief exposure time, e.g., 0.5 hour or less, may be adequate to achieve substantial crystallization at the upper extreme of the crystallization range; whereas, in the cooler end of the crystallization range, much longer periods of time, i.e., up to 24 hours or more, may be demanded.

Although temperatures as low as 800° C. can be operable, such are normally not utilized because the rate of crystal growth is generally so slow as to be unattractive from a practical point of view. Conversely, temperatures in excess of about 1300° C. are avoided since grain growth of the crystals and deformation of the article are hazarded. Therefore, the more useful range of crystallization temperatures has been defined as about 900°–1300° C.

If desired, a two-step heat treatment procedure may be followed. Thus, the glass article will first be heated to a temperature slightly above the transformation range, e.g., 750°–850° C. for a sufficient length of time, perhaps 1–8 hours, to cause extensive nucleation within the glass and initiate crystal growth. Thereafter, the nucleated article will be heated into the 900°–1300° C. range of about 2–10 hours to develop the desired fine-grained growth of crystals.

The products of the instant invention are conventionally highly crystalline, being greater than 50% by volume crystalline and, frequently, in excess of 75%, and the crystals are homogeneously dispersed within the minor residual glassy matrix.

Specific dwell periods were employed in the laboratory examples reported in Table III and such are commonly employed as a matter of convenience in production. However, that practice is not required to obtain satisfactory crystal growth. Rather, it is only necessary that the glass article be retained within the crystallization range for a sufficient period of time to promote extensive crystal development.

As was observed above, the growth of crystals is a function of both time and temperature. Hence, the rate at which the glass article is heated above its transformation range must be carefully controlled to avoid exceeding the rate of crystal growth. Stated differently, the rate of crystal growth must be sufficiently rapid so as to support the body against deformation and slumping as the temperature thereof is raised to approach or exceed the softening point of the glass. Heating rates of 10° C./minute can be successfully utilized, particularly where physical supporting members such as formers or setters are employed to restrain deformation of the glass bodies, but heating rates of about 3°–5° C./minute have generally been found to be acceptable with all compositions within the operable ranges. Thus, those heating rates have produced crystalline articles exhibiting little, if any, physical deformation over the full range of compositions constituting the invention. In each of the recited heat treatments in Table III, the temperature of an electric furnace was raised at a rate of about 5° C./minute to the listed dwell temperature and the crystallized articles permitted to cool to room temperature at furnace rate. Hence, after the heat treatment had been completed, the crystallized articles were simply left within the furnace, the electric current thereto cut off, and the articles allowed to cool to room temperature therein. This rate of cooling was estimated to range about 3°–5° C./minute.

Table III also records a visual description of the final crystallized product, an identification of the crystal phases present as determined through X-ray diffraction analysis, Knoop hardness measurement (100g), and approximate coefficient of thermal expansion measurements ($\times 10^{-7}/°$ C.) over the range of 0°–800° C. where made.

As has been explained above, an oxynitride phase, which has been denominated "nitrogen-mullite", has been observed which has an approximate stoichiometry of $Al_3Si_2O_7N$. The morphology of these crystals is lath-like or blade-like with fairly high aspect ratios, i.e., to about 10:1. This type of morphology renders the crystals useful in reinforcing an otherwise weak glass-ceramic matrix. Also observed were $Si_2ON_2$ and $\beta'$-$Si_3N_4$ which appear to be solid solutions containing $Li_2O$, $MgO$, $ZnO$, and $Al_2O_3$. For example, $Si_2ON_2$ is known to be isostructural with $LiAlSiN_2O$ when $Si^{+4} \rightleftarrows Li^+ + Al^{+3}$ substitution occurs. $\beta'$-$Si_3N_4$ is a solid solution of the type $M_x(Si,Al)_3(O,N)_4$ where $M=Li$, $Mg$, $Zn$, etc. $\beta'$-$Si_3N_4$ is of special interest because it is isostructural with $\beta$-$Si_3N_4$ which is well-known for its high strength, hardness, refractoriness, elastic modulus, and thermal shock resistance.

The silicate phases reported in Table III exhibited an X-ray diffraction pattern conventionally seen with such phases. However, as was observed above, chemical analysis has indicated the presence of nitrogen in the crystal phase. However, the manner in which the nitrogen is included within the silicate structure has not been completely determined. It has been postulated that the nitrogen actually forms part of the crystal lattice and is not present simply as an interstitial element.

Figure 1:
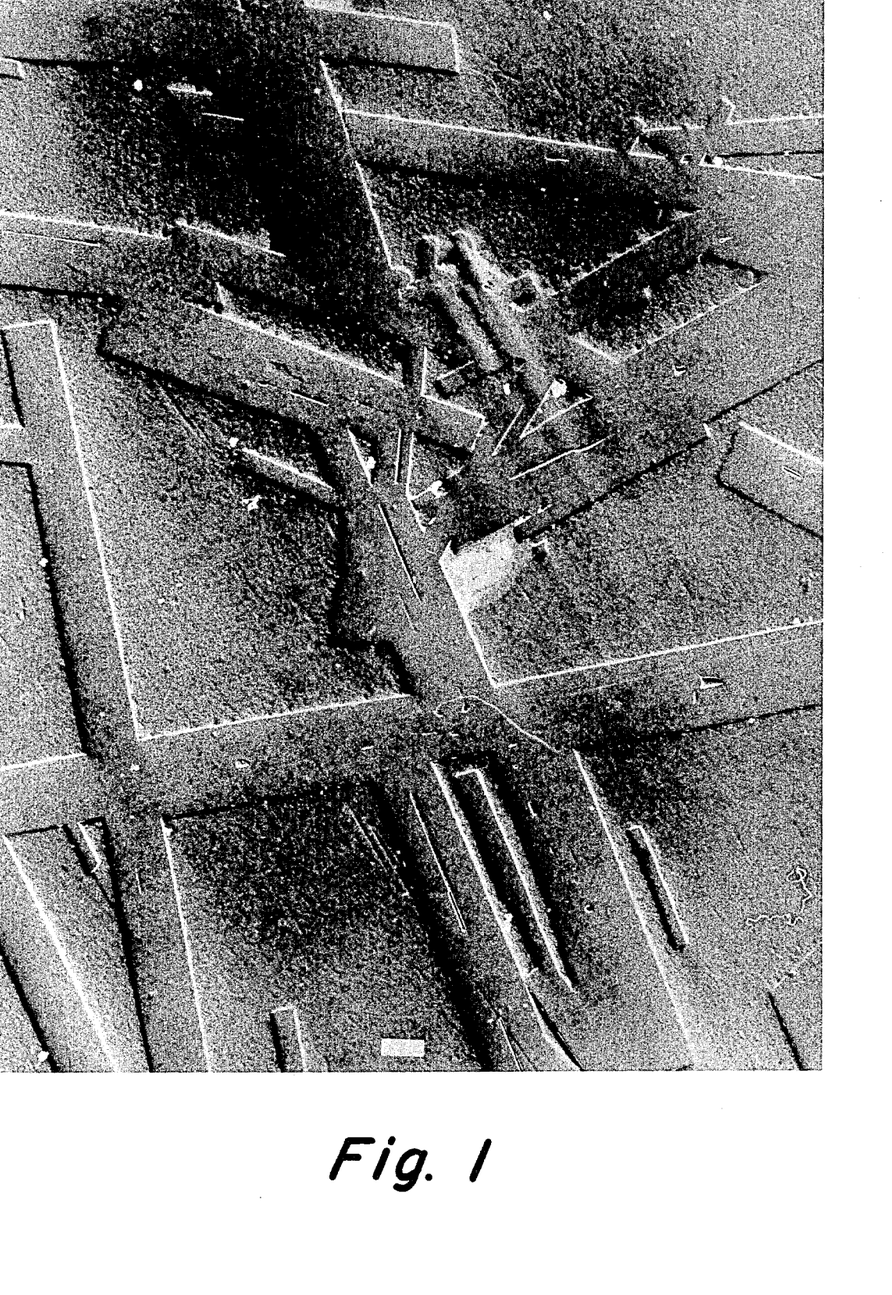
FIGS. 1-7 are electron micrographs of invention products.
Figure 2:
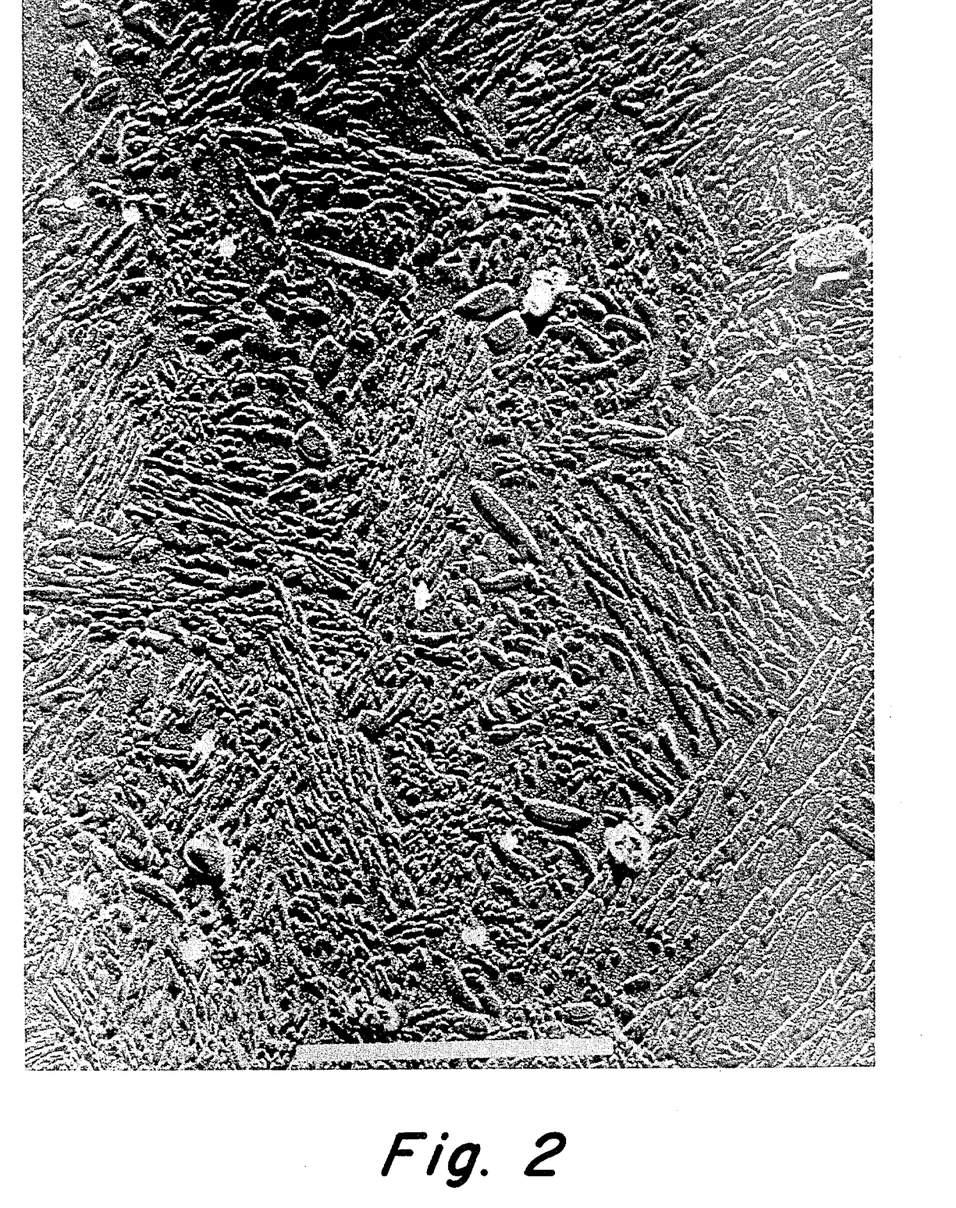
Figure 3:
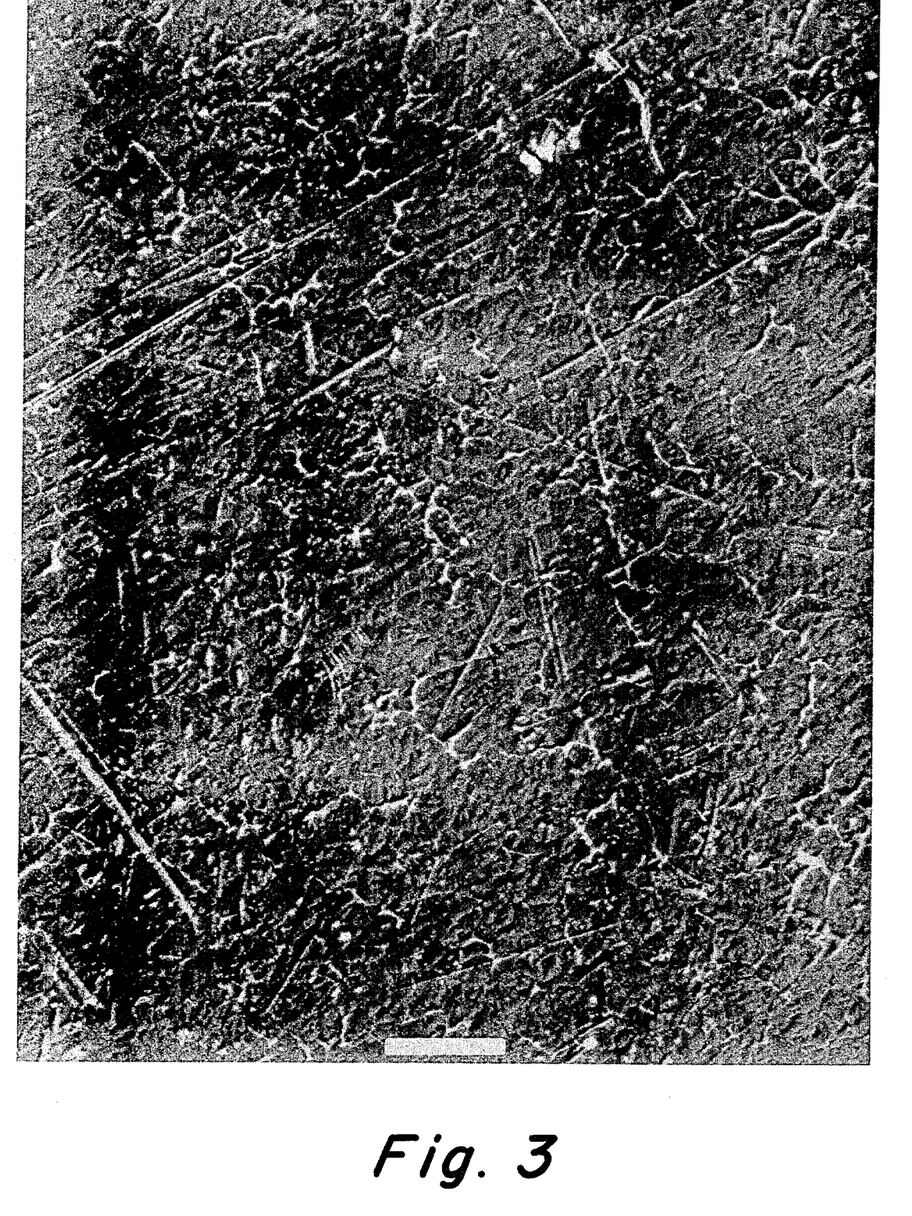

FIG. 1 is an electron micrograph of Example 38, which contains about 60–65% by volume $\beta'$-$Si_3N_4$, + "nitrogen-mullite", resulting from a heat treatment of two hours at 800° C. followed by two hours at 1000° C. FIG. 2 is an electron micrograph of Example 10, illustrating interconnected platelets of "nitrogen-mullite" resulting from a heat treatment of four hours at 1200° C. FIG. 3 is an electron micrograph of Example 46 demonstrating a very highly crystalline body wherein beta-spodumene solid solution constitutes the predominant crystal phase. The precursor thermally crystallizable glass was subjected to a heat treatment for two hours at 800° C. followed by four hours at 1000° C. This glass contained less than 3.5% nitrogen such that no nitride-containing solid solution as such was observed or identified.

TABLE III

| Example No. | Heat Treatment | Crystal Phases | Visual Description | Knoop Hardness | Exp. Coef. |
|---|---|---|---|---|---|
| 1 | 800° C. for two hours 1000° C. for four hours | Beta-Quartz solid solution | Opaque, gray, fine-grained | 636 | 21.0 |

TABLE III-continued

| Example No. | Heat Treatment | Crystal Phases | Visual Description | Knoop Hardness | Exp. Coef. |
|---|---|---|---|---|---|
| 2 | 1200° C. for four hours | Nitrogen-mullite solid solution | " | 666 | 47.2 |
| 3 | 800° C. for four hours<br>1100° C. for four hours | Nitrogen-mullite solid solution, beta-quartz solid solution | " | — | 44.3 |
| 4 | 1100° C. for four hours | " | " | — | 36.4 |
| 5 | 1200° C. for four hours | Nitrogen-mullite solid solution | " | 611 | 60.3 |
| 6 | 800° C. for four hours<br>1100° C. for four hours | " | " | 666 | 44.5 |
| 7 | 800° C. for four hours<br>1100° C. for four hours | " | " | — | 31.2 |
| 8 | 800° C. for four hours<br>1100° C. for four hours | " | " | — | 36.9 |
| 9 | 800° C. for two hours<br>1000° C. for four hours | Cordierite | " | 817 | 41.6 |
| 10 | 1200° C. for four hours | Nitrogen-mullite solid solution | " | 718 | 31.6 |
| 11 | 1200° C. for four hours | Nitrogen-mullite solid solution, beta-quartz solid solution | " | 704 | 42.5 |
| 12 | 1200° C. for four hours | Beta-spodumene solid solution | " | 569 | 34.0 |
| 13 | 800° C. for two hours<br>1100° C. for four hours | Beta-spodumene solid solution, beta-quartz solid solution | " | 616 | 28.0 |
| 14 | 800° C. for two hours<br>1100° C. for two hours | Beta-quartz solid solution | " | 561 | 39.0 |
| 15 | 1200° C. for four hours | Nitrogen-mullite solid solution, cordierite, beta-quartz solid solution | " | 732 | 50 |
| 16 | 800° C. for two hours<br>1100° C. for two hours | Beta-quartz solid solution | " | 647 | 47.0 |
| 17 | 800° C. for four hours<br>1200° C. for four hours | Nitrogen-mullite solid solution, beta-quartz solid solution | " | 684 | 37.0 |
| 18 | 1100° C. for four hours | $\beta'$-$Si_3N_4$, $Si_2ON_2$ | " | — | — |
| 19 | 1100° C. for four hours | Nitrogen-mullite solid solution | " | — | — |
| 20 | 1100° C. for four hours | " | " | — | — |
| 21 | 800° C. for two hours<br>1100° C. for two hours | Beta-quartz, solid solution | " | — | — |
| 22 | 800° C. for two hours<br>1100° C. for four hours | Beta-spodumene solid solution, beta-quartz solid solution | " | — | 25.0 |
| 23 | 800° C. for two hours<br>1100° C. for two hours | Mullite | " | — | 39.0 |
| 24 | 800° C. for two hours<br>1250° C. for four hours | $4BeO.2/Al_2O_3.6SiO_2$ | " | — | 37.0 |
| 25 | 800° C. for two hours<br>1250° C. for two hours | Mullite, cristobalite | " | — | 64.0 |
| 26 | 800° C. for two hours<br>1000° C. for four hours | Petalite, cordierite | " | — | 34.0 |
| 27 | 800° C. for two hours<br>1000° C. for four hours | $\beta'$-$Si_3N_4$, beta-spodumene solid solution, beta-quartz solid solution | " | — | 37.0 |
| 28 | 800° C. for two hours<br>1100° C. for four hours | Nitrogen-mullite solid solution | " | — | 31.0 |
| 29 | 800° C. for two hours<br>1050° C. for four hours | Beta-spodumene solid solution | " | — | 8.3 |
| 30 | 800° C. for two hours<br>1100° C. for four hours | Petalite, $Si_2ON_2$ | " | — | 41.0 |
| 31 | 800° C. for two hours<br>1100° C. for four hours | Cordierite | Opaque, gray, coarse-grained | — | 26.0 |
| 32 | 800° C. for two hours<br>1200° C. for four hours | Cordierite | " | — | 32.0 |
| 33 | 800° C. for two hours<br>1000° C. for four hours | Beta-quartz solid solution | Opaque, gray, fine-grained | — | 10.0 |
| 34 | 800° C. for two hours<br>950° C. for four hours | Beta-quartz solid solution | Opaque, gray, medium-grained | — | 4.0 |
| 35 | 800° C. for two hours<br>950° C. for four hours | Beta-spodumene solid solution, beta-quartz solid solution, $Si_2ON_2$ | Opaque, gray, fine-grained | — | 24.0 |
| 36 | 800° C. for two hours<br>1000° C. for four hours | Beta-quartz solid solution | " | — | 33.0 |
| 37 | 800° C. for two hours<br>1200° C. for four hours | Nitrogen-mullite solid solution | " | — | — |
| 38 | 800° C. for two hours<br>1000° C. for two hours | $\beta'$-$Si_3N_4$, nitrogen-mullite solid solution | " | — | 40.0 |
| 39 | 800° C. for two hours<br>900° C. for two hours | $Si_2ON_2$, beta-quartz solid solution | " | — | — |
| 40 | 800° C. for two hours<br>1000° C. for two hours | " | " | — | 32.0 |
| 41 | 800° c. for two hours<br>1000° C. for two hours | " | " | — | 24.0 |
| 42 | 800° C. for two hours<br>1000° C. for two hours | $\beta'$-$Si_3N_4$ | " | — | 40.0 |
| 43 | 800° C. for two hours<br>1000° C. for two hours | $Si_2ON_2$ | " | — | — |
| 44 | 800° C. for two hours | Nitrogen-mullite solid solution | " | 815 | — |

TABLE III-continued

| Example No. | Heat Treatment | Crystal Phases | Visual Description | Knoop Hardness | Exp. Coef. |
|---|---|---|---|---|---|
| 45 | 1300° C. for two hours 800° C. for 14 hours | Lithium disilicate, lithium metasilicate | " | — | — |
| 46 | 800° C. for two hours 1000° C. for four hours | Beta-spodumene solid solution | " | — | 0.0 |

As is apparent from a study of Tables II and III, the nitrogen-containing glasses are self-nucleating, i.e., no additional nucleating agents such as $TiO_2$, $ZrO_2$, or $SnO_2$, which have customarily been employed in the past for stimulating crystal growth, are necessary.

Figure 4:
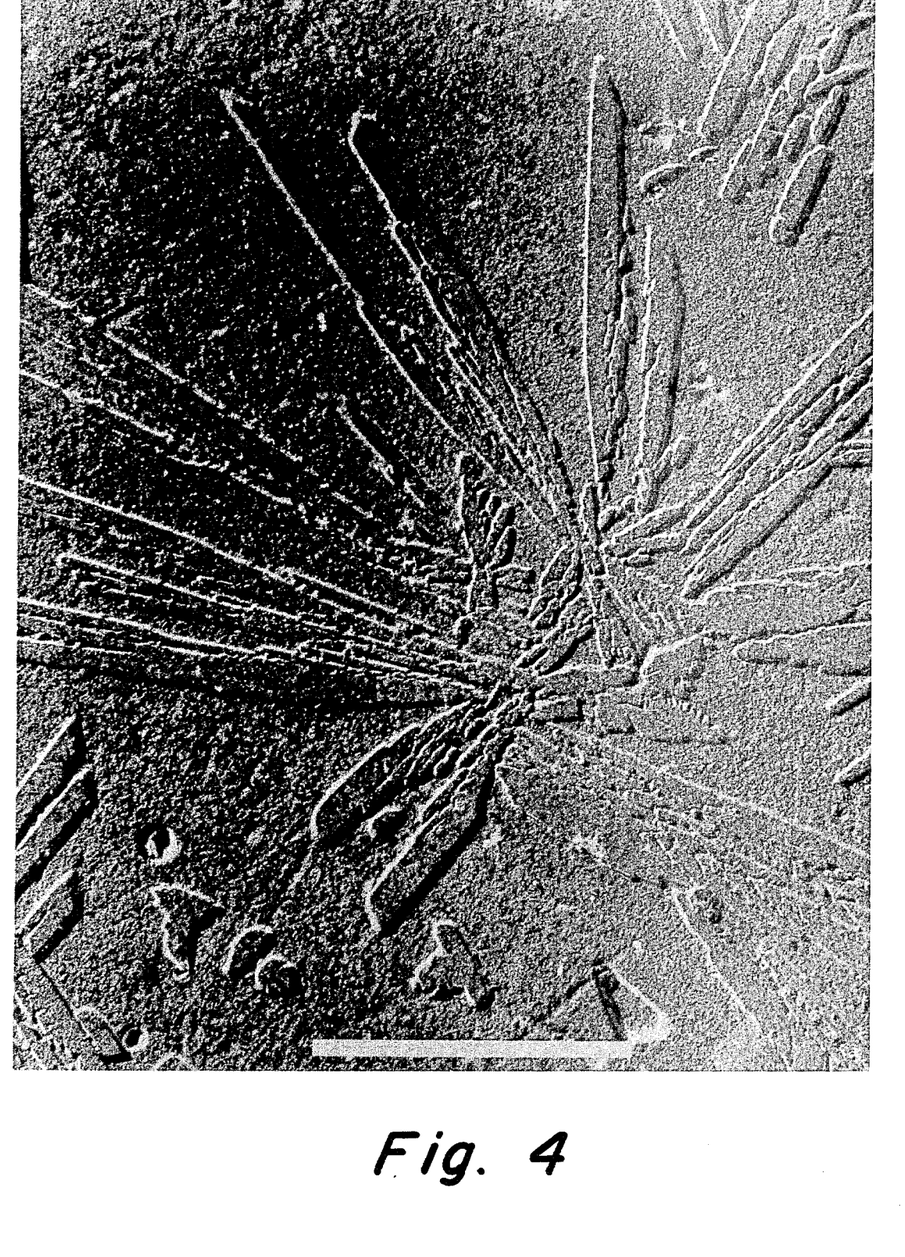
Figure 5:
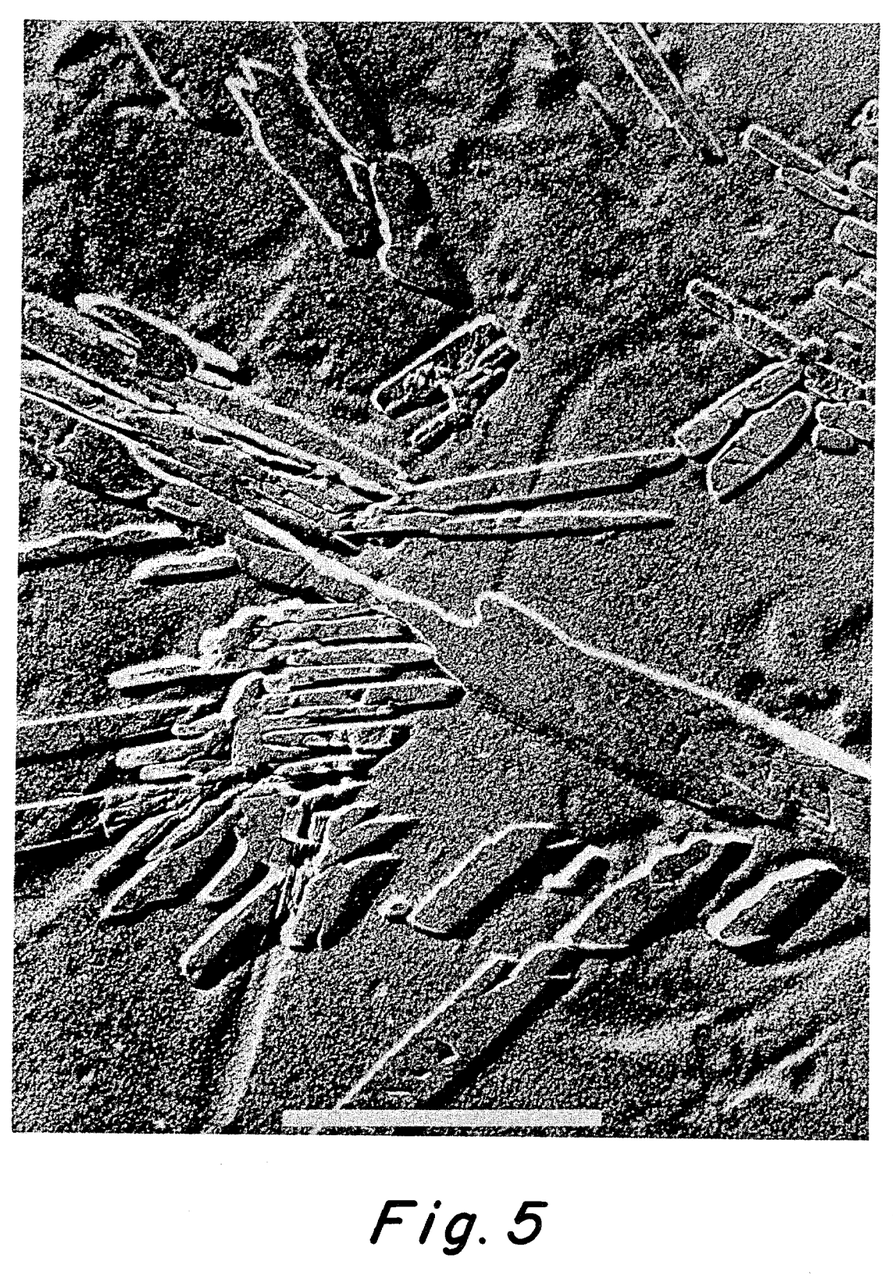
Figure 6:
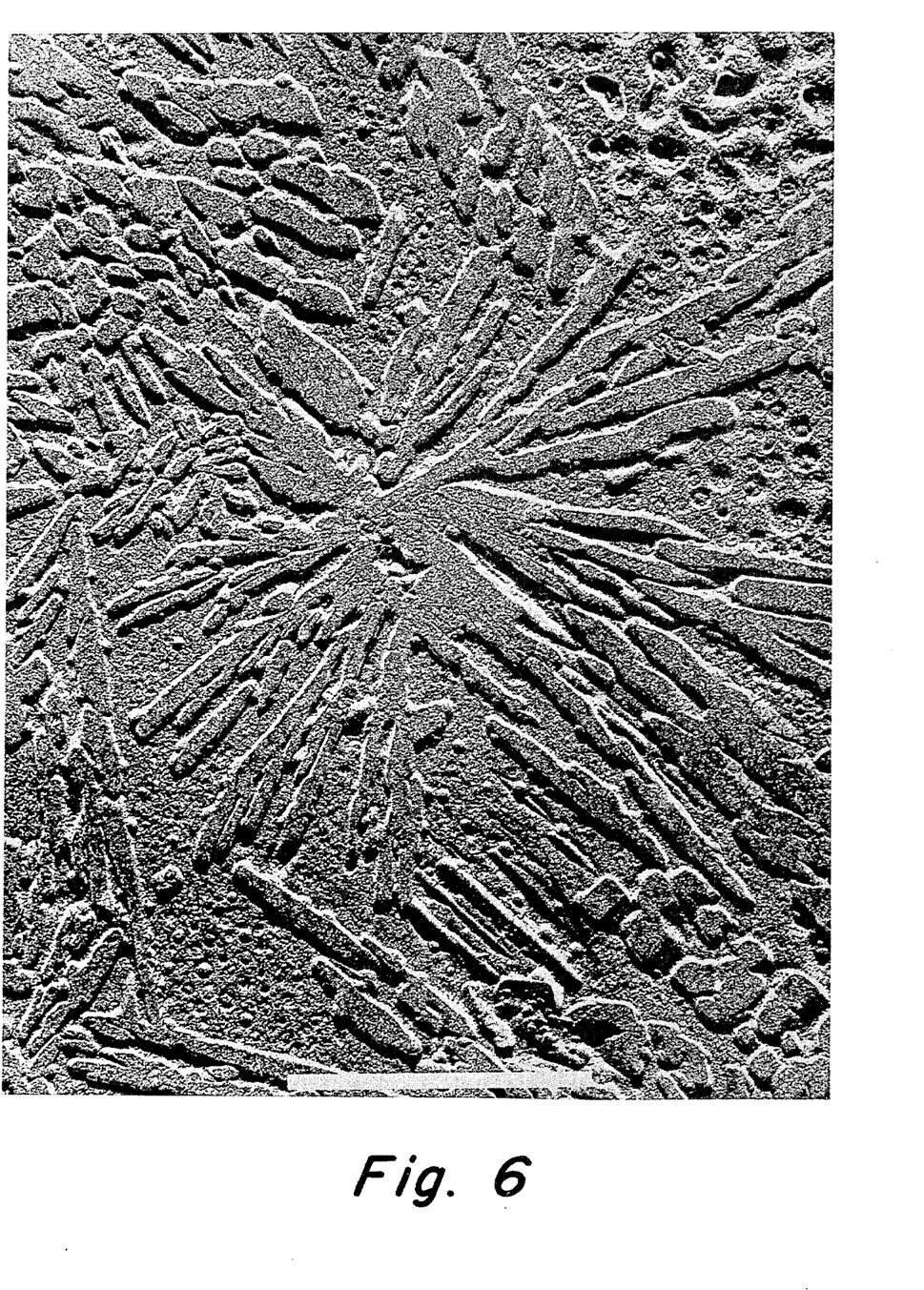

FIG. 4 is an electron micrograph of the glass-ceramic product of Example 3, FIG. 5 is an electron micrograph of Example 6, and FIG. 6 is an electron micrograph of Example 8. It is apparent from those micrographs that the presence of such large ions as $K^+$, $Cs^+$, and $Ba^{+2}$ causes the "nitrogen-mullite" to crystallize in the form of spherulites.

In articles where crystal phases containing substantial proportions of N are desired, i.e., solid solutions such as "nitrogen-mullite", $Si_2ON_2$, and $\beta'$-$Si_3N_4$, the inclusion of alkali metals other than $Li_2O$ appears to reduce the overall crystal content of the article such that the total thereof will preferably not exceed about 5% by weight. Where amounts of Group IIA and IIB modifying oxides in excess of about 15% by weight are employed, very little, if any, of the nitride and/or oxynitride crystallization will be developed even where high proportions of N are present. Instead, such phases as cordierite, hexacelsian, magnesium petalite, etc. will be formed. $Li_2O$, either alone or with other modifiers, appears to suppress the development of "nitrogen-mullite" in favor of $Si_2ON_2$ and/or $\beta'$-$Si_3N_4$ along with beta-quartz and/or beta-spodumene solid solutions. Therefore, whereas in lower $SiO_2$ compositions amounts up to about 12% by weight of $Li_2O$ may be operable, it is preferred to maintain the level thereof below about 10%. In general, the total of other extraneous compatible metal oxides will be held below about 5% by weight as will the amount of fluorine retained in the article.

Figure 7:
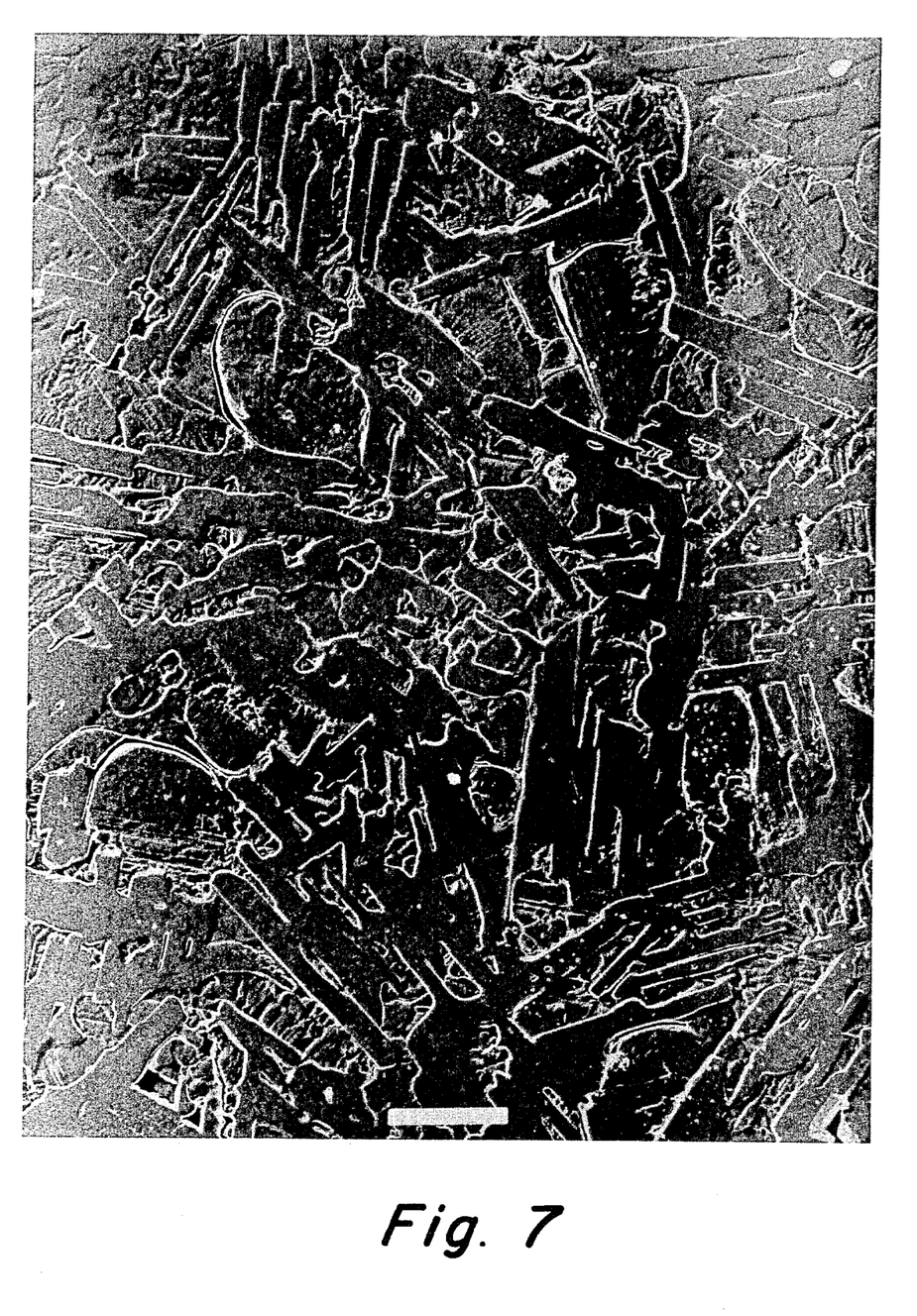

Example 15 utilizing a top heat treatment temperature of about 1200° C. is a preferred embodiment of the invention. As is shown in FIG. 7, the glass-ceramic body is highly crystalline and contains cordierite and beta-quartz solid solution well reinforced with "nitrogen-mullite" crystals to impart high strength.

We claim:

1. A glass-ceramic article having a crystal content in excess of about 50% by volume wherein the predominant crystal phase is selected from the group consisting of a silica crystal, a silicate crystal, and/or a nitrogen-containing crystal, the composition of said article consisting essentially, by weight, of about 40–80% $SiO_2$, 3.5–17% N, said $SiO_2$ and N constituting at least 50% by weight of the composition, and at least 15% $M_xO_y$, wherein $M_xO_y$ consists of about 10–40% $Al_2O_3$ and 5–25% of at least one oxide selected from the group consisting of the alkali metal oxides, the oxides of the elements of Group IIA and IIB of the Periodic Table, and $B_2O_3$.

2. A glass-ceramic article according to claim 1 wherein said predominant crystal phase consists of a nitrogen-containing crystal.

3. A glass-ceramic article according to claim 2 wherein said nitrogen-containing crystal consists of at least one solid solution selected from the group consisting of "nitrogen-mullite", $Si_2ON_2$, and $\beta'$-$Si_3N_4$.

4. A glass-ceramic article according to claim 1 wherein $M_xO_y$ consists of about 10–40% $Al_2O_3$ and not more than 20% of the oxides of the elements of Groups IIA and IIB of the Periodic Table, and/or not more than 12% $Li_2O$.

5. A glass-ceramic article according to claim 1 also containing up to about 5% by weight total of at least one member of the group consisting of MnO, $Y_2O_3$, $ZrO_2$, $La_2O_3$, and F.

* * * * *